United States Patent
Kommula et al.

(10) Patent No.: US 11,588,733 B2
(45) Date of Patent: Feb. 21, 2023

(54) SLICE-BASED ROUTING

(71) Applicant: VMWARE, INC., Palo Alto, CA (US)

(72) Inventors: Raja Kommula, Cupertino, CA (US); Jeremy Tidemann, Urbana, IL (US); Constantine Polychronopoulos, Palo Alto, CA (US); Marc Andre Bordeleau, Shawinigan (CA); Edward Choh, Richmond (CA); Ojas Gupta, Mountain View, CA (US); Robert Kidd, Champaign, IL (US); Georgios Oikonomou, Patras (GR)

(73) Assignee: VMWARE, Inc., Palo Alto, CA (US)

( * ) Notice: Subject to any disclaimer, the term of this patent is extended or adjusted under 35 U.S.C. 154(b) by 286 days.

(21) Appl. No.: 16/411,923

(22) Filed: May 14, 2019

(65) Prior Publication Data

US 2020/0366607 A1    Nov. 19, 2020

(51) Int. Cl.
*H04L 45/74*    (2022.01)
*H04L 45/30*    (2022.01)
*H04L 45/7453*    (2022.01)
*H04L 45/16*    (2022.01)
*H04L 45/00*    (2022.01)
*H04L 45/24*    (2022.01)
(Continued)

(52) U.S. Cl.
CPC .......... *H04L 45/7453* (2013.01); *H04L 45/16* (2013.01); *H04L 45/20* (2013.01); *H04L 45/245* (2013.01); *H04L 45/306* (2013.01); *H04W 40/246* (2013.01)

(58) Field of Classification Search
CPC ... H04L 45/7453; H04L 45/306; H04W 76/11
See application file for complete search history.

(56) References Cited

U.S. PATENT DOCUMENTS

| 7,391,786 B1 | 6/2008 | Prasad |
| 7,719,982 B2 | 5/2010 | Varma |

(Continued)

FOREIGN PATENT DOCUMENTS

| CN | 104468688 | | 3/2015 |
| CN | 105531970 | A | 4/2016 |

(Continued)

OTHER PUBLICATIONS

"International Search Report and Written Opinion", International Application No. PCT/US2020/014661, dated May 18, 2020.

(Continued)

*Primary Examiner* — Hoon J Chung
(74) *Attorney, Agent, or Firm* — Clayton, McKay & Bailey, PC

(57) ABSTRACT

In a slice-based network, switches can be programmed to perform routing functions based on a slice identifier. The switch can receive a packet and determine a slice identifier for the packet based on packet header information. The switch can use the slice identifier to determine a next hop. Using the slice identifier with a multi-path table, the switch can select an egress interface for sending the packet to the next hop. The multi-path table can ensure that traffic for a slice stays on the same interface link to the next hop, even when a link aggregation group ("LAG") is used for creation of a virtual channel across multiple interfaces or ports.

20 Claims, 5 Drawing Sheets

(51) Int. Cl.
  *H04L 45/302* (2022.01)
  *H04W 40/24* (2009.01)

(56) References Cited

U.S. PATENT DOCUMENTS

| | | | |
|---|---|---|---|
| 9,173,156 B2 | 10/2015 | Bai | |
| 9,722,935 B2 | 8/2017 | Bouanen | |
| 9,961,624 B1 | 5/2018 | Zait | |
| 10,182,129 B1 | 1/2019 | Peterson | |
| 10,374,956 B1* | 8/2019 | Tracy | H04L 47/825 |
| 10,601,724 B1 | 3/2020 | Filsfils | |
| 11,438,800 B2 | 9/2022 | Kozat | |
| 2008/0075002 A1 | 3/2008 | Fourcand | |
| 2010/0074113 A1 | 3/2010 | Muramoto | |
| 2012/0281528 A1 | 11/2012 | Hong | |
| 2013/0282893 A1 | 10/2013 | Pearce | |
| 2015/0029853 A1 | 1/2015 | Raindel | |
| 2015/0326448 A1 | 11/2015 | Chaudhary | |
| 2015/0326451 A1 | 11/2015 | Rao | |
| 2016/0048402 A1* | 2/2016 | Tsirkin | H04L 45/7453 718/1 |
| 2016/0112305 A1 | 4/2016 | Djekic | |
| 2016/0112335 A1 | 4/2016 | Bouanen | |
| 2016/0132798 A1 | 5/2016 | Picard | |
| 2016/0154660 A1 | 6/2016 | Clark | |
| 2016/0261495 A1 | 9/2016 | Xia | |
| 2016/0344565 A1 | 11/2016 | Batz | |
| 2016/0359872 A1 | 12/2016 | Yadav | |
| 2017/0214623 A1 | 7/2017 | Finkelstein | |
| 2017/0289270 A1 | 10/2017 | Li | |
| 2017/0346885 A1* | 11/2017 | Jiang | H04L 47/623 |
| 2018/0103091 A1 | 4/2018 | Kwak | |
| 2018/0131578 A1 | 5/2018 | Cui | |
| 2018/0131616 A1 | 5/2018 | Laberge | |
| 2018/0139129 A1 | 5/2018 | Dowlatkhah | |
| 2018/0152958 A1 | 5/2018 | Arnold | |
| 2018/0242161 A1 | 8/2018 | Vulgarakis Feljan | |
| 2018/0287891 A1 | 10/2018 | Shaw | |
| 2018/0295180 A1 | 10/2018 | Yang | |
| 2018/0316608 A1 | 11/2018 | Dowlatkhah | |
| 2018/0316615 A1 | 11/2018 | Shaw | |
| 2018/0376338 A1 | 12/2018 | Ashrafi | |
| 2019/0014496 A1 | 1/2019 | Kim | |
| 2019/0028382 A1 | 1/2019 | Kommula | |
| 2019/0034220 A1 | 1/2019 | Padmanabhan | |
| 2019/0053104 A1 | 2/2019 | Qiao | |
| 2019/0140904 A1 | 5/2019 | Huang | |
| 2019/0253962 A1 | 8/2019 | Kiessling | |
| 2019/0281466 A1 | 9/2019 | Zhang | |
| 2019/0319840 A1 | 10/2019 | Cheng | |
| 2019/0394132 A1 | 12/2019 | Zhang | |
| 2020/0029242 A1 | 1/2020 | Andrews | |
| 2020/0068430 A1 | 2/2020 | Chan | |
| 2020/0099625 A1 | 3/2020 | Yigit | |
| 2020/0128445 A1* | 4/2020 | Dong | H04W 28/0268 |
| 2020/0186411 A1* | 6/2020 | Ravichandran | H04L 41/0677 |
| 2020/0221346 A1 | 7/2020 | Park | |

FOREIGN PATENT DOCUMENTS

| | | |
|---|---|---|
| CN | 105579991 | 5/2016 |
| CN | 106357547 A | 1/2017 |
| CN | 106470116 A | 3/2017 |
| CN | 106716963 | 5/2017 |
| CN | 107277883 A | 10/2017 |
| CN | 107332913 | 11/2017 |
| CN | 107995045 | 5/2018 |
| CN | 108540384 | 9/2018 |
| CN | 108965121 A | 12/2018 |
| CN | 107659419 A | 1/2021 |
| KR | 1020180009046 | 1/2018 |
| WO | WO2016049332 | 3/2016 |
| WO | WO2018000240 | 1/2018 |
| WO | WO2018197924 | 11/2018 |
| WO | WO2018214506 | 11/2018 |
| WO | WO2018224151 | 12/2018 |

OTHER PUBLICATIONS

Gouareb, Racha, "Virtual Network Functions Routing and Placement for Edge Cloud Latency Minimization", IEEE Journal on Selected Areas in Communications (vol. 36, Issue 10), sections I-V, Sep. 24, 2018.
Samsung: "Idle mobility aspects to support network slicing", 3GP Draft; R2-1708083 Idle Mobility Aspects to Support Network Slicing, 3rd Generation Partnership Project (3GPP), Mobile Competence Centre; 650, Route Des Lucioles F-06921 Sophia-Antlpolis Cedex, vol. Ran WG2, No. Berlin, Germany Aug. 21, 2017-Aug. 25, 2017; Aug. 20, 2017.
International Search Report dated Jul. 16, 2020 for PCT/US2020/032769.
International Search Report dated Jul. 21, 2020 for PCT/US2020/032764.
International Search Report dated Jul. 22, 2020 for PCT/US2020/032768.
Office Action for CN202080010206.6 dated Sep. 30, 22.
Office Action for CN202080049472.X dated Sep. 29, 2022.
Extended EP Search Pursuant to Rule 62 EPC, EP Application No. 20745963.7.
Gouareb, Racha, "Virtual Network Functions Routing and Placement for Edge Cloud Latency Minimization", Oct. 1, 2018.
CN Office Action dated Nov. 11, 2022 for 202080051139.1.

* cited by examiner

SLICE-BASED ROUTING

BACKGROUND

Today's 3G, 4G, and LTE networks operate using multiple data centers ("DCs") that can be distributed across clouds. These networks are centrally managed by only a few operating support systems ("OSSs") and network operations centers ("NOCs"). 5G technology will dramatically increase network connectivity for all sorts of devices that will need to connect to the Telco network and share the physical network resources. Current network architectures cannot scale to meet these demands.

Network slicing is a form of virtualization that allows multiple logical networks to run on top of a shared physical network infrastructure. A distributed cloud network can share network resources with various slices to allow different users, called tenants, to multiplex over a single physical infrastructure. For example, Internet of Things ("IoT") devices, mobile broadband devices, and low-latency vehicular devices will all need to share the 5G network, These different use cases will have different transmission characteristics and requirements. For example, the IoT devices will typically have a large number of devices but very low throughput. Mobile broadband will be the opposite, with each device transmitting and receiving high bandwidth content. Network slicing can allow the physical network to be partitioned at an end-to-end level to group traffic, isolate tenant traffic, and configure network resources at a macro level.

In a traditional network, routing decisions are made based on the destination IP address of a packet. Each router looks at the destination internet protocol ("IP") address of the packet and forwards the packet to the next router based on a routing table at the router. However, in a slice-based virtual service network ("VSN"), a single IP address can be shared by packets in multiple slices where each slice can have its own path through the network. New techniques are required for routers to make forwarding decisions based on the slice to which a packet belongs rather than just a destination IP address.

Additionally, traditional switches can allow creation of a link aggregation group ("LAG"). A LAG can allow the links between switches to be bundled together into a single virtual link to distribute traffic across the links. However, in a slice-based network, packets that belong to the same slice can end up on different links, resulting in out-of-order delivery of data. Some links are longer than others, for example.

As a result, a need exists for new systems to perform slice-based routing in a VSN.

SUMMARY

Examples described herein include systems and methods for slice-based routing in a VSN. The system can include multiple switches, physical or virtual, distributed over a slice-based network on one or more clusters or clouds. The switches can be programmable to perform functions at the physical layer of the network. In one example, an orchestrator can remotely send programming commands to the switches. The switches can include programmable networking application-specific integrated circuits ("ASICs"), such as the Tofino chip, that can be programmed using the P4 language or some other protocol. Virtual switches likewise can be programmable.

Once programmed, the switches can perform stages for slice-based routing. For example, a switch can receive a first packet and determine, at the switch, a slice identifier that corresponds to that packet. The switch can do this based on the packet header information, which can uniquely identify the slice. In one example, the packet header includes a slice identifier based on prior assignment by a slice selector. Alternatively, the switch can use information in the packet header to determine the slice identifier. The switch can compare the packet header information against a slice table to identify the slice identifier ("ID").

Based on the slice identifier, the switch can determine a next hop for the packet. This can include retrieving a slice path or portion thereof from local storage at the switch. Based on the next hop and slice identifier, the switch can select an egress port from a plurality of ports available at the switch. In one example, the switch can determine whether a multi-path table exists for sending traffic to the next hop. If so, the switch can select the egress port from the multi-path table based on the slice identifier. In one example, the multi-path table is a Layer 3 equal-cost multi-path table. Multi-path tables can be used, for example, for ECMP or LAG functionality.

The switch can then send the packet from the egress port out into the physical network to the next hop, which can be another switch. In one example, the switch groups multiple egress ports together in a link aggregation group to the next hop. The link aggregation group can use the slice identifier to place the packet on a particular egress port within the link aggregation group.

These stages can be performed by a switch that follows a method, in an example. The stages can be part of a system that includes, for example, an orchestrator that programs the switch to run the agent and carry out the stages. Alternatively, a non-transitory, computer-readable medium including instructions can cause a processor at the switch to perform the stages when the processor executes the instructions. The term "switch" can broadly refer to any device performing network functionality, such as a server, router, or host.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a system includes multiple switches across one or more clusters or clouds in a VSN. An orchestrator can manage multiple slices within the network, which can be used for specific purposes or leased to tenants. For example, the slices can be reserved for particular applications, IoT devices, or customers. Each slice can be a virtual network that runs on top of a shared physical network infrastructure distributed across one or more Telco clouds. A slice can include a service chain of VNFs for performing certain network tasks.

In one example, a switch can use a slice ID for a packet for routing traffic. The switch can receive ingress packets having the same destination IP address but route them differently, to different switches, based on slice ID. The switch can be programmed to include slice paths that govern which output ports are used and what the next hop will be, based on slice ID.

The switch can also implement equal cost multi-path ("ECMP"). ECMP can include features in Layers 2 and 3 of the open systems interconnection ("OSI") model. In Layer 3, the networking layer, ECMP can be modified to use a slice-based table and additional logic when distributing traffic across multiple equal cost paths. Traditionally, using ECMP routing based on destination IP address to determine which ECMP route to use can result in out-of-order data in a slice-based network. To avoid this problem, multi-path tables for ECMP ("ECMP tables" or "ECMP routing tables") can instead be slice-based and keyed on slice ID. This can allow for using ECMP for slices when the switch is using ECMP to connect with the next hop. These slice-specific ECMP actions can be programmed into the switch by the orchestrator process, in an example.

For Layer 2 aspects of ECMP, the switch can implement LAG, in one example, to bundle ports together in a virtual channel to another switch. However, the packets with the same slice ID can be routed on the same link between the switches. This can ensure that the slice data remains in order. Without taking slice ID into account, data could arrive out of order based on different travel times across the links. This can be due to different travel distances for the links and other factors.

Figure 1:
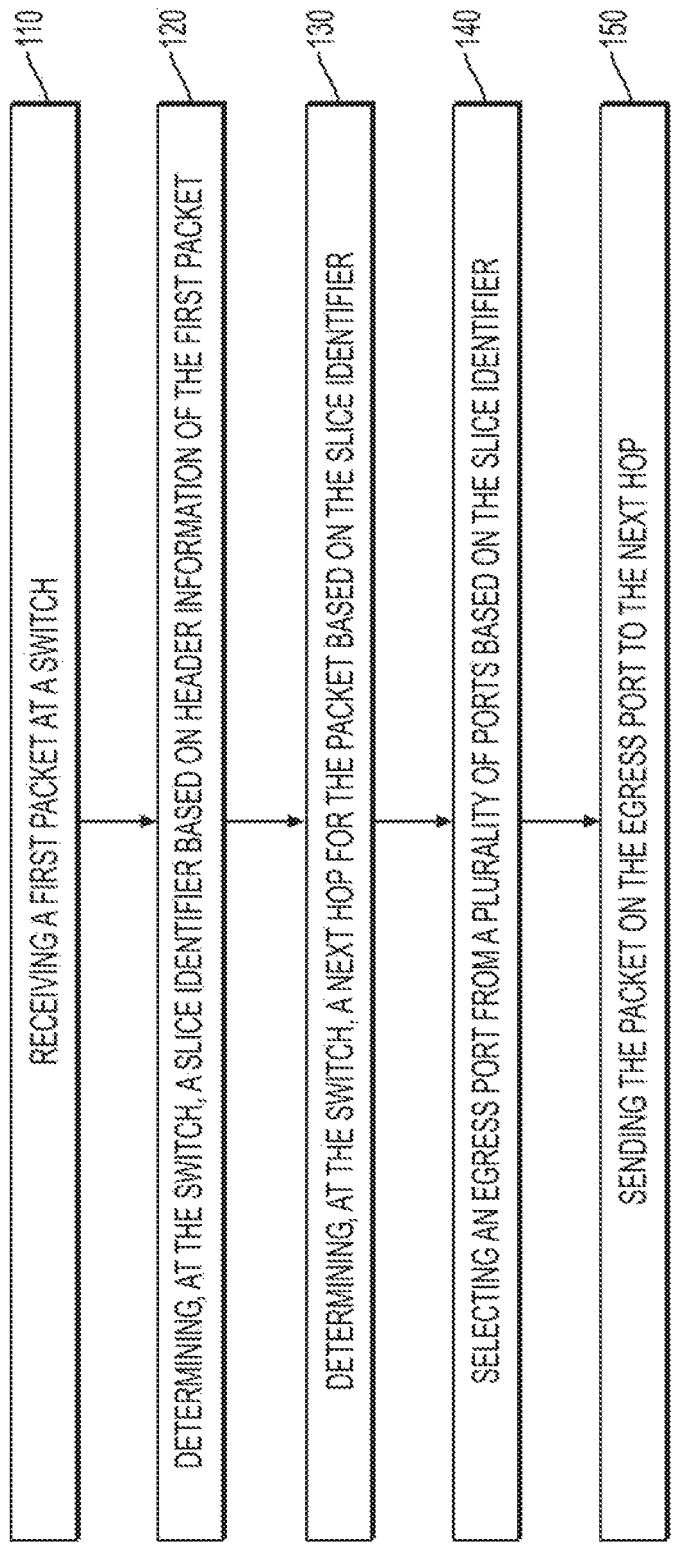
FIG. 1 is a flowchart of an example method for slice-based routing in a VSN.

FIG. 1 is an example flow chart for performing slice-based routing in a VSN. At stage 110, the switch receives a packet. The packet can be received at one of multiple ingress ports. The packet can be part of a slice in the VSN.

At stage 120, the switch can determine a slice identifier for the packet. The switch can do this by inspecting the packet header. For example, a switch or slice selector can use a combination of layer 2 to layer 4 (L2-L4) headers or by performing deep packet inspection (e.g., to classify traffic based on data in the layer 7 (L7) header). For example, slice selection can be based simply on the source device by using the source network layer (e.g., IP) address, or can be based on the type of traffic or destination network domain by looking at the L7 header. In some embodiments, the network slice selector maintains state for mapping connections to network slices so that deep packet inspection does not need to be performed on each data message of a connection. In addition, for some connections, only certain data messages contain the L7 header information required for performing the slice selection.

When performing slice selection using deep packet inspection, the initial data message for a connection may not include the L7 header information that the slice selector needs to correctly identify the slice. For example, a connection between an endpoint device (for example, a mobile device such as a smart phone or tablet, a laptop or desktop computer, an IoT device, a self-driving automobile, a smart camera belonging to a security system) and a network domain often begins with a set of connection initiation messages, such as a TCP handshake. After completion of the handshake, the device then sends, for example, an http get message that includes the network domain. Subsequent data messages sent between the device and the network domain may not include such information.

After initial slice selection at the selector, the routers can be updated to include slice tables (one type of routing table) that correlate packet header information to slice ID. This can allow the switch to use the packet header can include address information to look up the slice ID. For example, the packet header can list source and destination media access control ("MAC") addresses, source and destination internet protocol ("IP") addresses, source and destination ports, and indicate a packet protocol. With this information, the switch can identify a slice ID in a local slice table. An example slice table is shown below, as Table 1.

TABLE 1

Slice Table

| Source IP | Dest IP | Source Port | Best Port | Protocol | Slice ID |
|---|---|---|---|---|---|
| 192.168.100.10 | 10.1.2.10 | 1111 | 2222 | 6 | 1 |
| 192.168.100.11 | 10.2.3.11 | 3333 | 4444 | 6 | 2 |
| 192.168.100.12 | 10.3.4.12 | 5555 | 6666 | 17 | 3 |

The agent can use source IP address ("Source IP"), destination IP address ("Dest IP"), source port, destination port, and a protocol type to find the correlated Slice ID. The protocol type can be represented as a number in one example, with different numbers correlating to different packet types, such as ICMP, ARP, and TCP.

The slice table can be programmed into the switch by an orchestrator process, in an example. For example, an orchestrator can remotely program the switches to perform slice-specific actions. In one example, the switches include programmable networking application-specific integrated circuits ("ASICs"), such as the TOFINO chip, that can be programmed using the P4 language or some other protocol.

At stage 130, the switch can determine a next hop for the packet based on the slice ID. A next hop can be another switch in the slice path. To determine the next hop, the switch can access a routing table using the slice ID. The routing table can return information regarding the slice path for that slice ID, including the next hop. The routing table can be located locally on the switch. In one example, the orchestrator programs the switch to include the routing table. The orchestrator can contact the switch to update the routing table each time the orchestrator changes a slice path that impacts routing by the switch. For example, if a first slice path includes a next hop of switch 2 and a new slice path includes a next hop of switch 3, the orchestrator can send that information to the switch so that future traffic for that slice can be routed to switch 3.

An example routing table is shown below as Table 2.

TABLE 2

Routing Table

| Slice ID | Dest IP | Next Hop | Interface |
|---|---|---|---|
| 1 | 10.1.2.10 | 10.1.2.1 | 1 |
| 2 | 10.1.2.10 | 10.1.2.2 | 1 |
| 3 | 10.3.4.12 | 10.3.2.1 | 2 |

An example routing table is shown below in Table 2. Using the slice ID and a destination IP, the next hop can be determined. In one example, the routing table can also provide which egress interface to use. In another example, the routing table can be the same as the slice table, such as the slice table of Table 1, in an example. In that example, one or more additional columns can represent the next hop or egress interface. Alternatively, the Dest IP or Dest Port of Table 1 can be used to determine the egress interface. Using a routing table can also include looking up information in an ECMP routing table or one or more LAG tables, as will be discussed below.

At stage 140, the switch can select an egress port for the packet based on the slice identifier. For example, the slice can have an assigned egress interface in the routing table that corresponds to the next hop. Selecting an egress port can be achieved by selecting an egress interface, in an example. An egress interface can have packet queues and other mechanisms, such as load balancing algorithms, that govern when the packet is actually sent to the next hop from an egress port at the egress interface.

In one example, the switch can support ECMP. Traditional ECMP routing can allow traffic with the same source and destination to be transmitted across multiple paths of equal cost. This can allow for load balancing traffic and increasing bandwidth by fully utilizing otherwise unused bandwidth on links to the same destination (next hop). When ECMP is used, next-hop paths of equal cost are identified based on routing metric calculations and hash algorithms. That is, routes of equal cost can have the same preference and metric values, and the same cost to the network. The ECMP process can identify a set of routes, each of which is a legitimate equal cost next hop towards the destination. The identified routes are referred to as an ECMP set. Because it addresses only the next hop destination, ECMP can be used with various routing protocols. In one example, ECMP can operate with a Layer 3 networking protocol of the OSI model. Layer 3 can be referred to as the network layer of a networking model.

In one example, the information accessed from the slice table can be used with an ECMP routing table, an example of which is shown below in Table 3. ECMP can allow use of multiple paths between two switches and determine how to distribute traffic across those paths when the paths are of equal metrics.

TABLE 3

ECMP Routing Table

| Subnet | Netmask | ECMP Member Count | ECMP Members |
|---|---|---|---|
| 10.1.2.0 | 255.255.255.0 | 6 | 192.168.1.1 |
| | | | 192.168.2.1 |
| | | | 192.168.3.1 |
| | | | 192.168.4.1 |
| | | | 192.168.5.1 |
| | | | 192.168.6.1 |
| 10.2.3.0 | 255.255.255.0 | 4 | 192.168.7.1 |
| | | | 192.168.8.1 |
| | | | 192.168.9.1 |
| | | | 192.168.10.1 |
| 10.3.4.0 | 255.255.255.0 | 3 | 192.168.11.1 |
| | | | 192.168.12.1 |

As shown in Table 3, each row can represent an ECMP set. The ECMP Members can represent next hops that are based on a subnet corresponding to a destination IP address. For example, for subnet 10.1.2.0 (and mask 255.255.255.0), six different possible next hops (ECMP members) are available in the ECMP set. The second ECMP set has four next hops, and the third ECMP set has two next hops.

In one example, the slice table (e.g., Table 1) and ECMP routing table (e.g., Table 3) can be used to determine the next hop. For example, for a packet with a Slice ID of 1, the destination IP is 10.1.2.10. This corresponds to the first ECMP set, which has a subnet of 10.1.2.0.

An ECMP set can be formed when the ECMP routing table, such as in Table 3, contains multiple next-hop addresses for use in reaching the same destination with equal cost. Routes of equal cost have the same (or similar within a threshold) preference and metric values. If there is an ECMP set for the active route, a load balancing algorithm can be used to choose one of the next-hop addresses in the ECMP set to install in the forwarding table.

The ECMP can use load balancing to select between the multiple links in the ECMP set. In one example, slice-based load balancing can be used to distribute the packets across the multiple links. Packets having the same slice ID can be guaranteed to take the same link. For example, a table correlating slice ID to the links can be used. Alternatively, an additional column on Table 3 can indicate Slice ID, such that slice is used to select between the links in the ECMP set.

In one example, a hash that includes the slice ID can be used to choose which ECMP path corresponds to the packet. This approach can also allow for distribution of different slices across different links while the same slice operates on the same link. The hash can include source and destination IP and source and destination ports.

The hash can be used as an ECMP ID in one example, to select which link applies to the packet. For example, the ECMP table can include a column for ECMP ID and another column for egress interface or port, similar to Table 5, which is discussed below. Additionally, a hash seed can be used for load balancing purposes. The hash seed can cause more slices to use one link than another, for example. This can allow one or more links to be preserved for high priority slices.

In one example, an ECMP operation can be modified at the switch to accommodate slice-based routing. Table 4, below, includes pseudocode related to sliced-based use of an ECMP table, such of that of Table 3, in an example.

TABLE 4

Example Pseudo Code for Egress Interface Selection

```
foreach packet P
    slice = getSlice(P->smac, P->dmac, P->sip,
        P->dip, P->sport, P->dport, P->proto)
    nexthop = getRoute(slice->id)
    if isECMP(nexthop)
        ecmp = getECMPIntf(nexthop->ecmp_id)
        hash_id = create_hash(slice->id, P->ip_id,
            ecmp->ecmp_member_count)
        egressInterface = ecmp->ecmp_members[hash_id]
    elseif
        lag = getLAGIntf(nexthop->lag_id)
        hash_id = create_hash(slice->id, P->ip_id,
            lag->lag_member_count)
        egressInterface = lag->lag_members[hash_id]
    endif
    sendPacket(P, egressIntf)
endfor
```

Turning to the pseudocode of Table 4, when a packet is received by the switch, the switch can determine the slice ID, as discussed for stage 120. In this example, the agent can retrieve the slice ID from a slice table (e.g., Table 1) based on source IP address ("sip"), destination IP address ("dip"), source port ("sport"), destination port ("dport"), and protocol type ("proto"). Then, the agent can get the next hop using the slice ID from the routing table, such as Table 1 or Table 2, as described for stage 130. This can include looking up a next hop address in the routing table based on, for example, slice ID and destination IP. The routing table can include a column for slice ID and another column for next hop.

In this example, at stage 140, the switch can determine if the next hop is represented in the ECMP routing table (e.g., Table 3), which can be used to determine which link (e.g., ECMP Member) to take to the next hop. For example, if the Subnet exists in Table 3 for the Dest IP of Table 1, then the agent can use ECMP to determine which of the links (ECMP Members) to take to the next hop.

ECMP can be modified to use Slice ID to make this link determination. In one example, the agent retrieves or generates a hash. The hash (hash_id) can be created (create_hash) using slice ID, the packet destination IP address, and the ECMP member count, in an example. This hash ID can then be used to select which of the ECMP members applies to the packet.

The load balancing algorithm can determine which link to use for the slice when multiple links are available having the same (or similar within a threshold) preference and metric values. If there is an ECMP set for the active route, a load balancing algorithm can be used to choose one of the next-hop addresses in the ECMP to use for the packet, based on the slice ID. The load balancing algorithm can also preferentially treat one or more slices relative to others. For example, a first link can be reserved for a preferred slice when performance on that link falls below a threshold. For example, 911 calls can be the only slice using a particular link when multiple links are available to the next hop and the slice for 911 is prioritized. Slice prioritization can be determined at the switch or orchestrator based on service level agreement ("SLA") requirements for a slice. For example, each slice can have guaranteed performance characteristics, such as threshold levels of latency, throughput, and bandwidth. SLA records can explicitly assign prioritization parameters, in an example, that are used by the switch for load balancing purpose.

In one example, the orchestrator supplies the switch with a slice-based load balancing algorithm to use in ECMP routing. This can be based on slice priorities and slice routes, in an example.

For the purposes of this disclosure, selecting an egress interface can be the same as selecting an egress port.

Selecting an egress port at stage 140 can further include ensuring that the slice routes properly according to Layer 2 ("L2") of the OSI model, which can be referred to as the data link layer. In one example, the switch can implement a LAG using, for example, the link aggregation control protocol ("LACP"). A LAG can group together links between switches by bundling ports into a channel. LACP can be used with load balancing and ECMP, in an example. An example L2 forwarding table is shown below in Table 4. Additionally, an example LAG table is shown in Table 5.

TABLE 4

L2 Forwarding Table

| Dest MAC | LAG ID |
|---|---|
| 00:01:01:01:01:01 | 1 |
| 00:02:02:02:02:02 | 2 |
| 00:03:03:03:03:03 | 3 |

TABLE 5

LAG Table

| LAG ID | LAG Member Count | LAG Member Ports |
|---|---|---|
| 1 | 8 | 1, 2, 3, 4, 5, 6, 7, 8 |
| 2 | 2 | 9, 10 |
| 3 | 3 | 11, 12, 13 |

In one example, the LAG can be modified to utilize a slice ID to select the port through which the packet will travel. This can include routing all packets that belong to the same slice down the same link.

Conventional approaches that do not use slice ID for LAG can result in out-of-order data delivery when the two different links are use, which can result in errors in data transmission. This is because the packets for a single slice could be distributed on different links, which can have different distances and travel times to the next hop (switch). For example, a first link can be one kilometer long while a second link is ten kilometers long. Incorporating slice ID into choosing the LAG link can ensure that the switch keeps the packets for the slice together. For example, slice ID can be used along with packet information (source IP address, destination IP address, source port, and destination port) to create a hash regarding which link to choose. The hash can be keyed on the overall number of available links and used as an index to select the link such that slices are distributed across the links.

Continuing with the pseudocode from Table 3, if the next hop is not included in the ECMP routing table, then the agent can retrieve a lag interface for the next hop (e.g., getLAGIntf), such as the level 2 ("L2") forwarding table exemplified in Table 4 or the LAG table exemplified in Table 5. In one example, the LAG ID is determined based on L2 information, such as destination MAC address ("Dest MAC") shown in Table 4. The destination for the packet (information about the next hop) can be matched against Dest MAC to determine a LAG ID. Then, from the LAG table, the agent can retrieve the corresponding LAG Member Count and LAG member ports.

The agent can then determine which of the LAG Member Ports to use based on slice ID, ensuring that packets from the same slice stay together. This can include creating a hash that is used to select the LAG Member Port. The hash can be based on slice ID, destination IP address ("P→ip_id"), and the LAG member count, in an example that uses Table 5. The egress interface can be determined by selecting the LAG Member Port by using the hash as an index or selector.

Then, the agent can send the packet P to the egress interface that was chosen through slice-based selection using ECMP or LAG.

ECMP and LAG can be used together for load balancing purposes, to increase bandwidth and throughput on the switch. By incorporating slice ID into the lookup for ECMP and LAG, the switch can keep data together for a slice and also select links based on slice prioritization. For example, ECMP can use a first link for a high priority slice and ensure that the congestion on that link remains low as part of load balancing. In this way, different slices can be balanced across the ports. Aggregation of links can likewise be based on slice prioritization, such as by forming a LAG that is primarily or solely used by a high priority slice.

At stage 150, the switch can send the packet out into the network, to the next hop, using the egress interface (i.e., egress port) selected based on one or more of the routing table, ECMP, and LAG. The egress process can be governed by a policing algorithm that determines which packets are output through the egress ports first. In one example, the switch uses a FIFO algorithm, in which packets are routed to the egress queues in the order in which they are received in the slice-based pool. Alternatively, a slice round robin ("SRR") algorithm can be used, in which one packet from each slice is forwarded at a time. For example, the switch can take a packet from each slice-based ingress queue and route it to the appropriate interface into an egress queue for the same slice. In another example, a slice-weighted round robin algorithm ("SWRR") is used. In SWRR, packets can be forwarded based on a weight of each slice.

Figure 2:
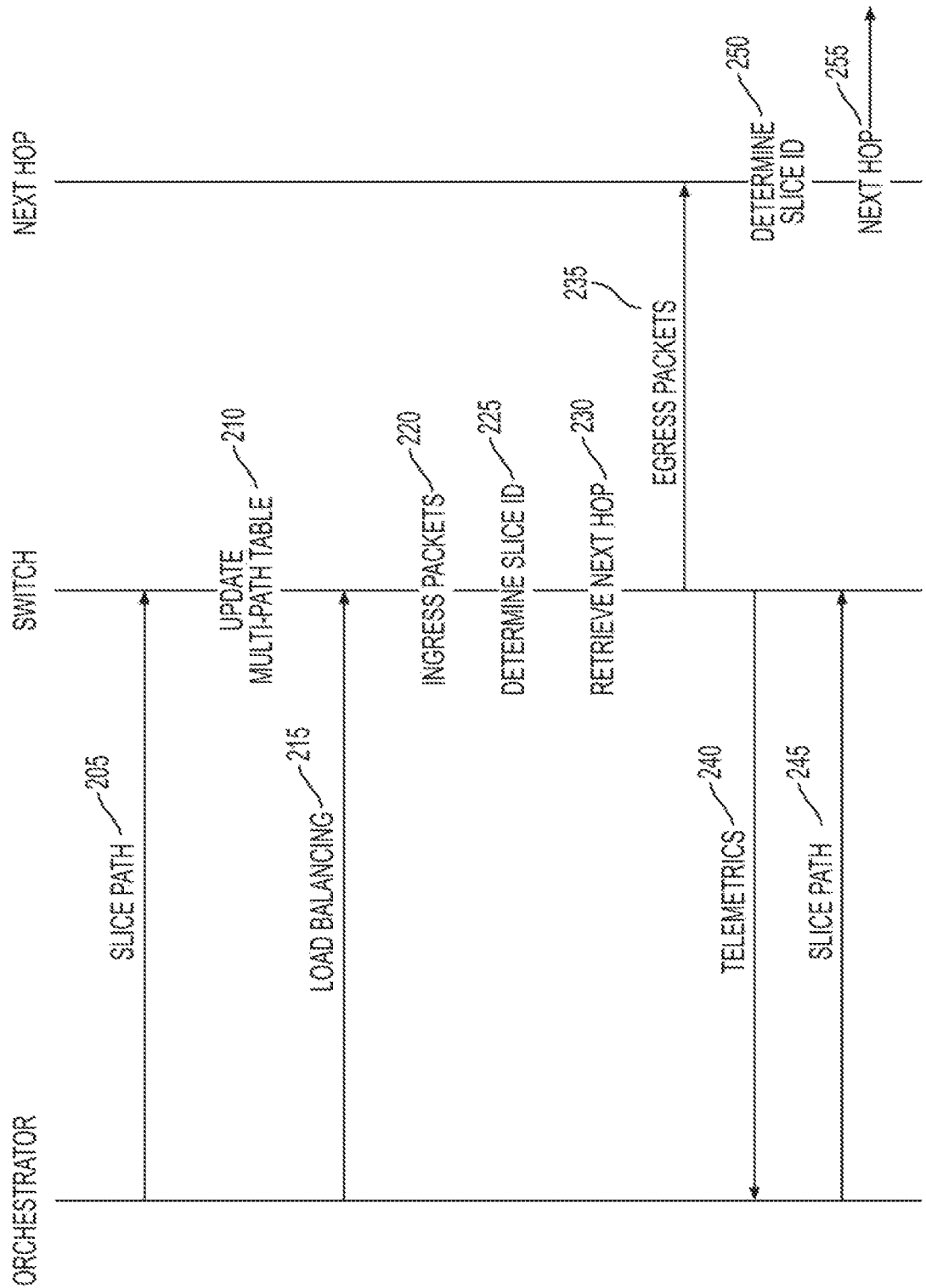
FIG. 2 is an example illustration of a sequence diagram for slice-based routing in a VSN.

FIG. 2 is an example illustration of a sequence diagram for slice-based routing in a VSN. At stage 205, an orchestrator sends slice path information to a switch. The switch can be programmable, such that the slice path information is used to update a slice table and other tables on the switch. For example, the slice table can indicate which egress interface to utilize for which slice. The slice table can also be used to determine a slice ID in some examples based on packet header information, such as source and destination IP addresses, MAC address, and ports.

At stage 210, the switch can use the slice path information to update a multi-path table, such as an ECMP routing table or LAG table. In general, these can be referred to as routing tables. In one example, the routing table is slice-based, such as Table 2. In one example, ECMP and LAG can be modified to operate based on slice ID. For example, a hash based on the slice ID for the packet can be used as an index to select the ECMP or LAG member to use as the egress interface. In another example, the ECMP routing table can be modified to also operate based on slice ID. This can allow traffic with the same source and destination to be transmitted across multiple paths of equal metrics, based on slice ID. For example, different slice IDs can correspond to the different paths such that slice data can be kept together on the same link of a LAG.

At stage 215, policing and load balancing algorithms can be sent to the switch from the orchestrator. This can occur as part of stage 205 in an example. The load balancing algorithm can be used in conjunction with the multi-path table to determine which packets to place on which links (egress ports), based on slice ID. The policing algorithm can be used to determine the order of packets output into the network in times of congestion.

At stage 220, the switch can receive ingress packets. These packets can be received on multiple ingress ports from multiple source locations. For each packet, the switch can determine the slice ID at stage 225. In one example, the switch reads the slice ID from the packet header. An upstream switch or slice selector can write the slice ID into the packet header for use by other switches in the network. Alternatively, the switch can determine the slice ID by looking it up in a slice table maintained locally at the switch. To do this, the switch can use packet header information that will be unique to the slice, such as the combination of source and destination IP addresses. MAC addresses, and ports.

Based on the slice ID, the switch can then retrieve the next hop at stage 230. A routing table can include next hop information for each slice. In one example, switch can check for ECMP routing. This can be a separate lookup at an ECMP table in one example. Alternatively, an ECMP process on the switch can update the routing table based on ECMP, allowing the switch to lookup the correct egress interface based on slice ID in the routing table. The egress interface can dynamically change based on load balancing for ECMP or based on changed characteristics of different links in a LAG. For example, if a particular link is not performing well, a load balancing algorithm can move a prioritized slice onto a different link. When the next hop is retrieved at stage 230, the routing table can include updated information such that the packet for that slice is routed to the different link.

At stage 235, the packet is sent into the network to the next hop. The order with which packets are sent into the network from the switch can be governed by a policing algorithm, in an example. The policing algorithm can be used to prioritize egress packets that belong to prioritized slices. This prioritization can escalate based on congestion. Congestion can be detected at the switch or detected downstream and reported back to the switch.

The next hop can be another switch where similar stages are performed. For example, the next switch can determine slice ID at stage 250. Based on the slice ID, that switch determine a new next hop at stage 255. The packets can continue through the network in this way until reaching a final destination, which can be slice-specific. For example, a slice can end at a call center, a database, a server, or other hardware that is used to carry out the purpose of the slice.

The switches can also be programmed by the orchestrator to execute an agent that reports telemetric data back to the orchestrator at stage 240. The telemetric data can include any performance data related to latency, bandwidth, throughput, round-trip time, or any other performance metric of an SLA. The telemetric data can be used by the orchestrator or a related process to determine how to alleviate network congestion, in an example. This can include changing load balancing or policing algorithms at one or more switches, in an example. It can also include re-routing a slice in a network.

When the orchestrator makes a change, such as changing a slice path, that change can be reported to impacted switches at stage 245. In the case of a new slice path, the switch can be programmed to indicate the correct next hop for use in that new slice path. In one example, the orchestrator can send a message to the switch that causes the switch to update one or more routing tables based on the new slice path. This can include determining whether the next hop is part of the existing ECMP and updating the routing tables accordingly. For example, if a first slice originally had a next hop at switch 1 in a first ECMP set but the updated next hop at switch 2 is not part of that ECMP set, then the ECMP routing table can be updated. The first set can be load balanced differently according to the additional available bandwidth. Additionally, if a second ECMP set connects to switch 2, the ECMP routing table can be updated to include the slice in that set.

Figure 3A:
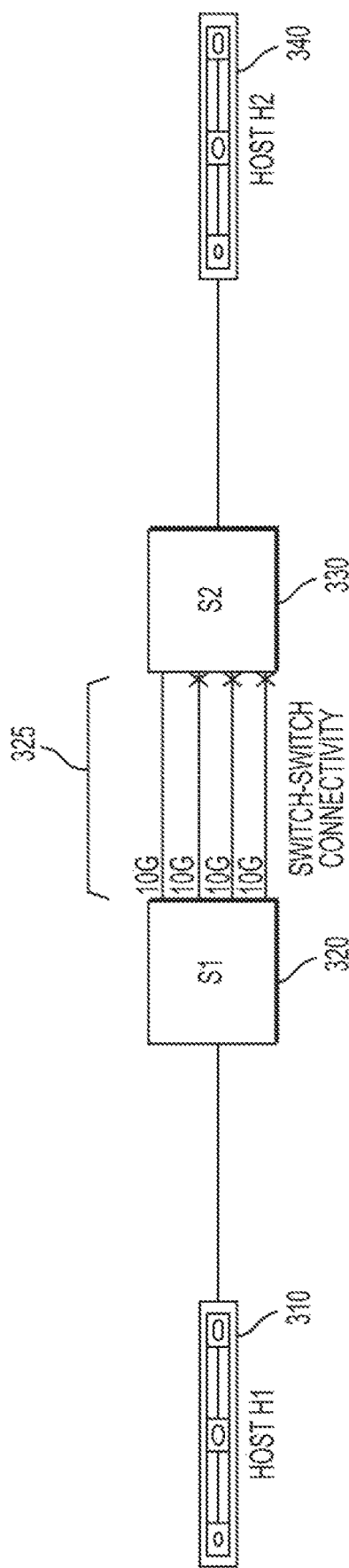
FIG. 3A an example illustration of system components used in routing packets.

FIG. 3A an example illustration of system components used in routing packets without LAG. In this example, a host 310, such as a server, sends packets to a first switch 320. The first switch 320 can include multiple links 325 to a second switch 330 that is in the path to a destination host 340. In this example, the first and second switches 320, 330 are connected using four 10 Gbps interfaces, which comprise the links 325. However, a network operating system ("OS") on the switches 320, 330 can disable three of those 10 Gbps interfaces based on Layer 2 loops. A switching loop can occur in a network when there is more than one Layer 2 path between two nodes, such as the first and second switches 320, 330. These loops can create broadcast storms based on the switches 320, 330 forwarding broadcasts at all the ports and Layer 2 packet headers not supporting a time to live ("TTL") value. Because having multiple links 325 can be attractive for redundancy reasons, loops are typically eliminated using a shortest-path bridging ("SPB") protocol. The downside of this approach is that the redundant links 325 remain inactive, indicated by x's in FIG. 3A. This means the overall bandwidth of the switch is less than optimal.

Figure 3B:
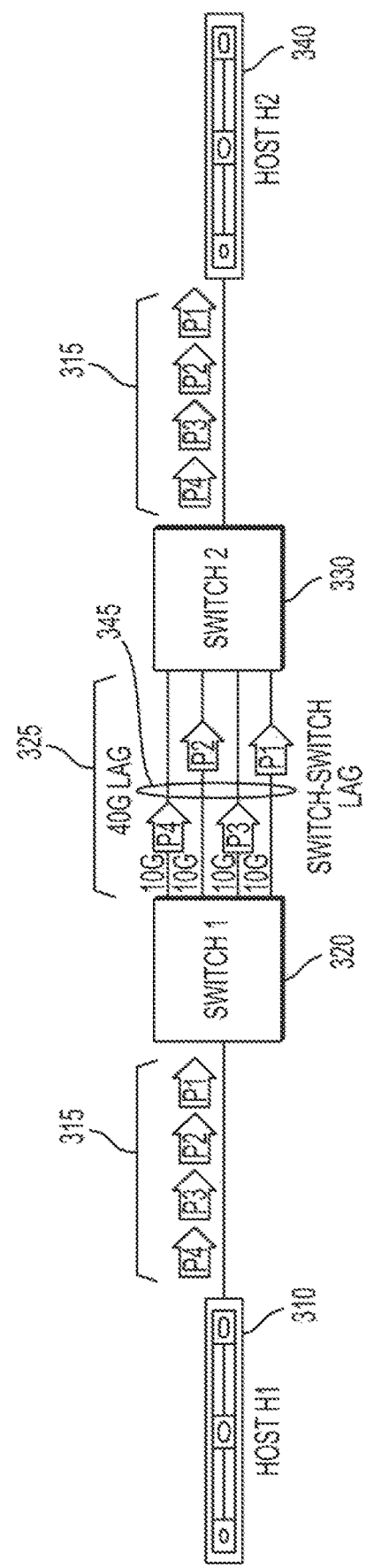
FIG. 3B an example illustration of system components for slice-based routing in a VSN.

Bandwidth can be increased by using a LAG, such as with ECMP, as shown in FIG. 3B. FIG. 3B is an example illustration of system components for slice-based routing in a VSN. As shown in FIG. 3B, packets 315 coming into the first switch 320 can be routed evenly over the links 325 using a switch-to-switch LAG 345. A load balancing algorithm on the first switch 320 can distribute the packets 315 across all of the links 325 between the switches 320, 330.

In one example, the packets 315 are distributed on the links 325 according to slice ID. In this example, the links 325 are bundled together into a single virtual link, but slice ID is used to maintain packets from the same slice on the same link. The link used for a particular slice can change in an example, based on load balancing. However, first and second packets with the same slice ID can be kept on the same link within the virtual channel. This can ensure that packets for a slice do not arrive out-of-order at the second switch 330. This allows the second switch 330 to forward the packets 315 to the destination host 340 without introducing errors in a flow for a slice.

Figure 4:
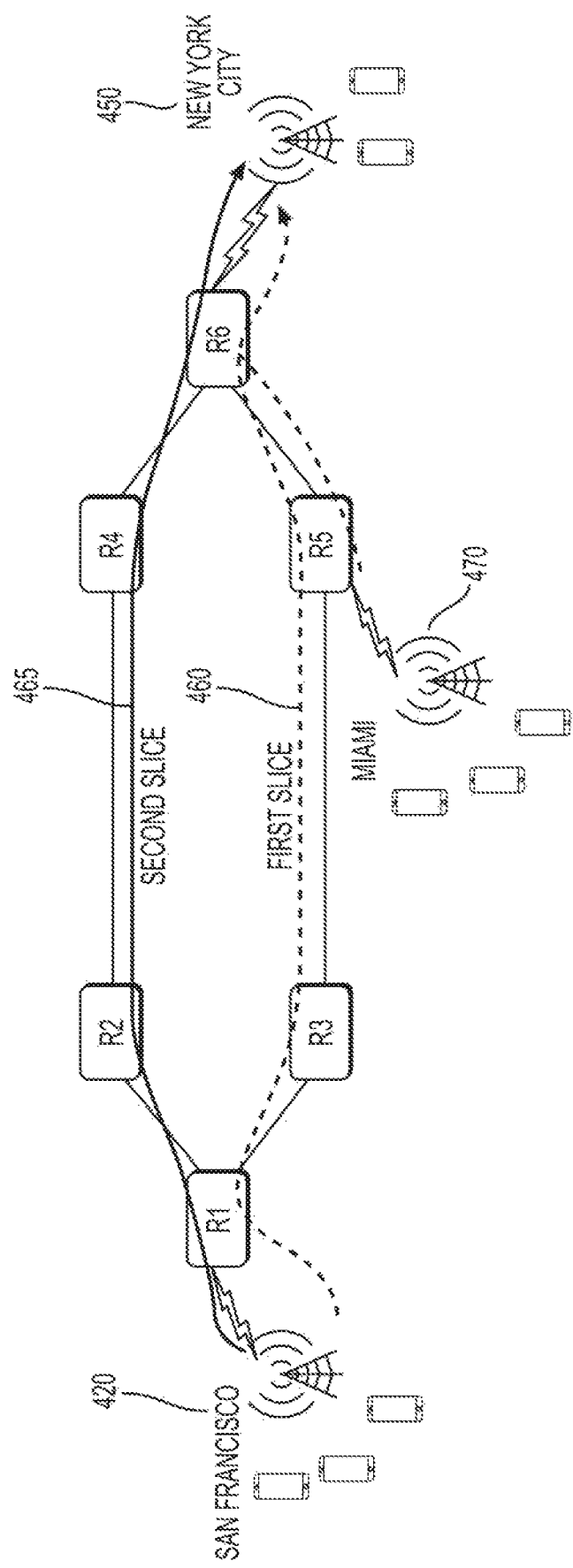
FIG. 4 is an example illustration of system components used for routing packets in different slice paths.

FIG. 4 is an example illustration of system components used for routing packets in different slice paths in a VSN. A first slice 460 can span switches R1, R3, R5, and R6. A second slice 465 can span switches R1, R2, R4, and R6. Both slices 460, 465 span from San Francisco 420 to New York City 450 in this example, but take different routes across that span. The switches in this example can be routers. These switches can each calculate packet rate and timing information for each slice 460, 465, in an example.

Slice paths, routes through the VSN, can be changed based on an orchestration process. For example, prior to the illustration in FIG. 4, both the first and second slices 460, 465 can take the same slice path through the network, shown as the path of the first slice 460. In that example, the second slice 465 originally has a slice path from San Francisco 420 to New York City 450 that traverses switches R3 and R5 (as currently shown for the first slice 460 in FIG. 4). Based on congestion, the slice path for the second slice 465 can have been changed to use switches R2, R4 (as currently shown in FIG. 4) instead of switch R3, R5. To do this, the orchestrator can update routing tables at switch R1 to change the next hop to switch R2 instead of switch R2. The routing tables at switches R2, R3, R4, and R5 can also be updated to reflect the new slice path. The orchestrator can also instantiate VNFs needed by the second slice at switches R2 and R4.

Updating the routing tables can include updating slice-based tables for ECMP and LAG. When the next hop changes, the ECMP sets can also change relative to which slices are in which sets. For example, at a first switch R1, a first ECMP set can include both the first and second slices 460, 465. However, when the first slice 460 is re-routed to follow a slice path along switches R2, R4, the first switch R1 can no longer include the first slice 460 in the first ECMP set. This is because the next hop is now switch R2 instead of switch R3. Therefore, the first switch R1 can remove the first slice 460 from the first ECMP set and instead place it in a second ECMP set that includes bundled links to switch R2. In one example, the switch is programmed to change its ECMP sets each time it receives new slice path information.

As previously mentioned, the orchestrator can change slice paths based on congestion. To detect congestion, the orchestrator can use telemetric data, such as the packet rate and timing information from the various switches. Using this data, the orchestrator can attempt to aggregate throughput for each slice 460, 465. However, switches R3 and R5 can have duplicate packet rate data for the first slice 460 going from San Francisco 420 to New York 450, but switch R5 will also include non-duplicative and relevant packet rate data for the first slice 460 going from Miami 470 to New York 450. Therefore, while the data from switch R3 should be ignored, the Miami 470 data at switch R5 should be included in calculating throughput for the first slice 460, in an example. This is because the first slice 460 has two different illustrated flows, one from San Francisco 420 and another from New York City 450.

Although an orchestrator is referred to as an example, a separate process that communicates with the orchestrator, such as a monitoring module, can perform the steps attributed to the orchestrator in the examples herein.

Figure 5:
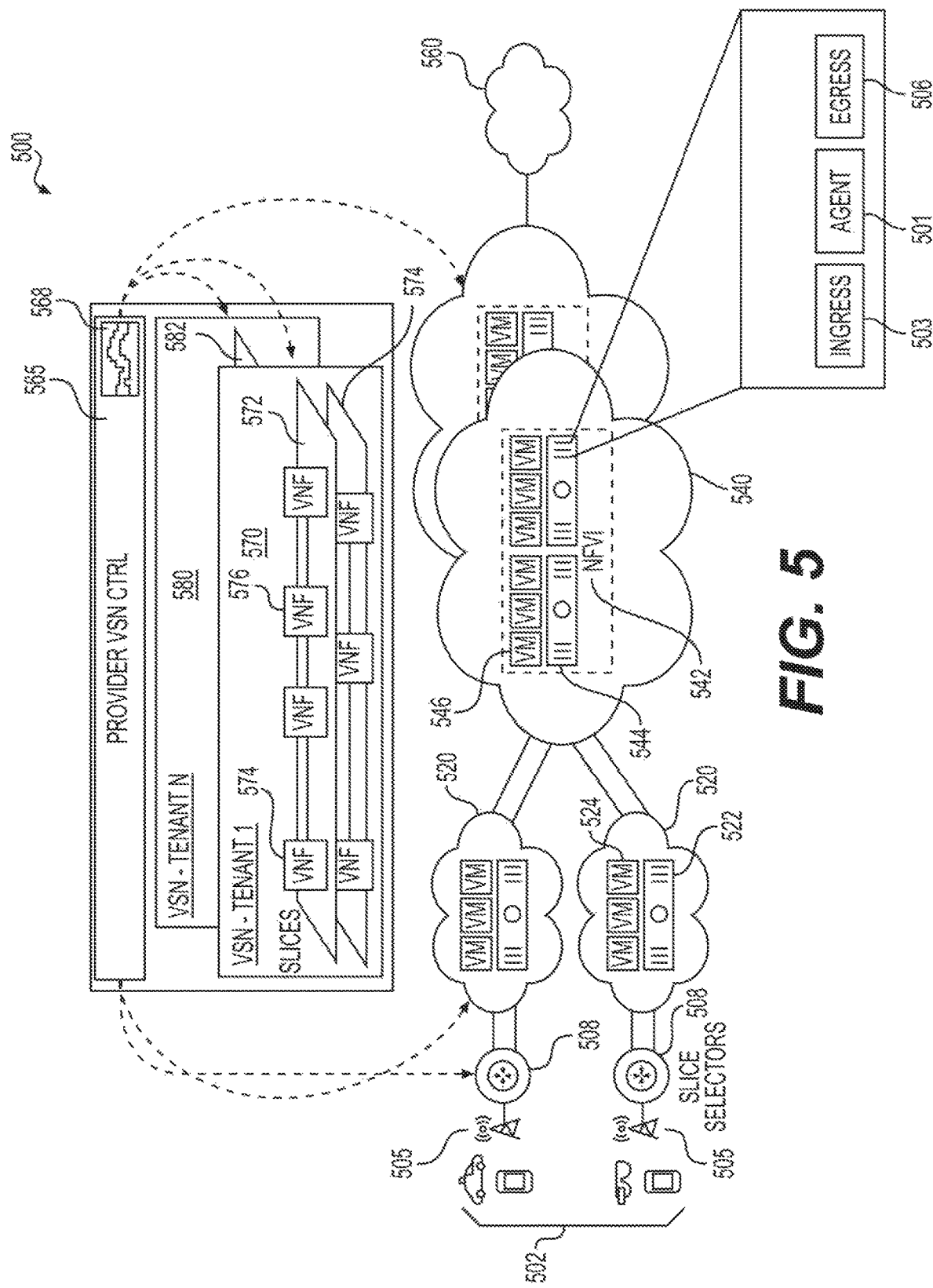
FIG. 5 is an example system diagram of a topology for a VSN.

FIG. 5 is an example diagram of system components in a VSN 500. The VSN 500 can be a distributed Telco cloud network with one or more clouds 520, 540. Slices 572, 578, 582 can be distributed across these clouds 520, 540.

Each cloud 520, 540 can have physical and virtual infrastructure for network function virtualization ("NFV") 542. For example, physical switches 544, such as routers and servers, can run VMs 546 or microservices that provide VNF functionality. A slice can include a first VNF that executes on an edge cloud 520. The VNF can utilize one or more vCPUs, which can be one or more VMs 524 in an example. However, the edge cloud 520 can execute numerous VNFs, often for multiple tenants where the VNFs are part of various slices. The slices can be kept separate from a functional perspective, with VNFs from different slices not aware of the existence of each other even when they rely on VMs 524 operating on shared physical hardware 522.

A first VNF in the slice path can communicate with a second VNF, which can be located in a different cloud 540. For example, the second VNF can include one or more VMs 546 operating on physical hardware 544 in a core cloud 540. The second VNF can communicate with yet another VNF in the slice path. One or more of these VNFs can act as an egress to the internet 560, in an example.

One or more user devices 502 can connect to a slice in the VNF 500 using, for example, a 5G data connection. The user devices 502 can be any physical processor-enabled device capable of connecting to a Telco network. Examples include cars, phones, laptops, tablets, IoT devices, virtual reality devices, and others. Cell towers 505 or other transceivers can send and receive transmissions with these user devices 502. At the ingress point to edge clouds 520, slice selectors 508 can receive data sent from the user devices 502 and determine which slice applies. The slice selectors 508 can operate as VMs 524 in the edge cloud or can run on different hardware connected to the edge cloud 520. The slice selectors can use information in the packet headers to determine which slice the packets belong to, in an example.

In one example, a slice selector 508 initially processes the packets and assigns them to one of the network slices of the VSN. The slice selector 508 can also handle service chaining operations to ensure that the packets processed by the correct set of network services for the assigned slice. In various examples, the slice selector 508 can be implemented by a VM, a software forwarding element (e.g., a flow-based forwarding element) operating within a VM or within virtualization software of a host computer, a set of modules executing outside of a forwarding element (e.g., between a VM and a port of a forwarding element) within virtualization software of a host computer, among others.

In some cases, many slice selectors 508 are configured for a VSN. In a telecommunications service provider example, a network slice selector can be configured for each cell tower, base station, or other aspect of the access network. The telecommunications service provider access network can include edge clouds for each cell tower and configure at least one slice selector 508 at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM).

Slice selection can be based on information in the packet header for a packet. For example, a switch or slice selector can use a combination of layer 2 to layer 4 (L2-L4) headers or by performing deep packet inspection (e.g., to classify traffic based on data in the layer 7 (L7) header. For example, slice selection can be based simply on the source device by using the source network layer (e.g., IP) address, or can be based on the type of traffic or destination network domain by looking at the L7 header. In some embodiments, the network slice selector maintains state for mapping connections to network slices so that deep packet inspection does not need to be performed on each data message of a connection. In addition, for some connections, only certain data messages contain the L7 header information required for performing the slice selection.

When performing slice selection using deep packet inspection, the initial data message for a connection may not include the L7 header information that the slice selector needs to correctly identify the slice. For example, a connection between an endpoint device (for example, a mobile device such as a smart phone or tablet, a laptop or desktop computer, an IoT device, a self-driving automobile, a smart camera belonging to a security system) and a network domain often begins with a set of connection initiation messages, such as a TCP handshake. After completion of the handshake, the device then sends, for example, an http get message that includes the network domain. Subsequent data messages sent between the device and the network domain may not include such information.

To manage the distributed virtual infrastructure, a provider can run a topology 565 of management processes, including an orchestrator 568 having a monitoring module. The orchestrator 568 can alternately communicate with a monitoring module that runs separately on a different server or in a different virtual environment. In that example, the monitoring module can be part of the topology 565 that works with the orchestrator 568. One example framework for these processes is VCLOUD NFV by VMWARE, which can use VSPHERE for network virtualization and VREALIZE for virtual analytics. An example orchestrator is CLOUDIFY.

The orchestrator 568 can be responsible for managing slices and VNFs, in an example. This can include provisioning new slices or re-provisioning existing slices based on performance metrics and network load. The orchestrator 568 can run on one or more physical servers located in one or more core clouds 520, 540 or separate from the clouds. The orchestrator 568 can provide tools for keeping track of which clouds and VNFs are included in each slice. The orchestrator 568 can further track slice performance for individual tenants 570, 580, and provide a management console. The orchestrator 568 can also receive performance metrics and load information and determine when the monitoring module should find a new slice path.

In this example, a first tenant 570 has multiple slices 572, 574. Each slice 572, 578 can be defined by a slice record that indicates VNF requirements for that slice. VNFs 574, 576 can each provide different functionality in the service chain.

In addition, an SLA can specify various threshold performance requirements for the slices. These performance requirements can include latency, round-trip time, bandwidth, and others. These can serve as per-slice QoS requirements, in an example.

The orchestrator 568 can rely on the monitoring module to receive telemetric information from the switches 522, 544 and determine if the SLA is satisfied. In one example, the monitoring module provides the switches 522, 544 with an agent 501. The switches 522, 544 can be programmed to execute the agent 501. The monitoring module can also supply user-defined policing algorithms that the switch uses to move packets from ingress ports 503 to egress ports 506, and from egress ports 506 to the next hop in the physical network 500. The monitoring module can also supply slice path information that the switches 522, 544 use to determine next hops and which egress interfaces (e.g., ports) to use for those next hops.

The orchestrator 568 can also change settings in the slice selectors 508 and switches 522, 544 to ensure traffic routes correctly down a slice path.

Although the orchestrator 568, virtual management topology, and monitoring module are referred to separately, these processes can all operate together. The examples are not meant to limit which process performs which step. Instead, the monitoring module can be considered any portion of the virtual management topology that performs the described stages.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for slice-based routing, comprising:
receiving a first packet at a switch;
determining, at the switch, a slice identifier for the first packet based on header information of the first packet, wherein the slice identifier uniquely identifies a slice from a plurality of slices in a virtual service network ("VSN"), wherein the plurality of slices represent different virtual networks on a shared physical network infrastructure;
determining, at the switch, a next hop for the first packet;
selecting an egress interface from a plurality of interfaces based on the slice identifier,
wherein the slice identifier is used to create a hash, and the hash is used to select the egress interface; and
sending the first packet from the egress interface to the next hop.

2. The method of claim 1, further comprising determining a different next hop for a second packet, wherein the first and second packets include a same destination address but have different slice identifiers.

3. The method of claim 1, wherein determining the slice identifier includes looking up the slice identifier at the switch based on a destination machine address control ("MAC") address, destination internet protocol ("IP") address, and destination port.

4. The method of claim 1, further comprising:
determining whether a multi-path table exists for sending traffic to the next hop, the multi-path table including multiple links for sending traffic to the next hop; and
when the multi-path table exists, selecting the egress interface from the multi-path table based on the hash created using the slice identifier.

5. The method of claim 4, wherein the multi-path table is a Layer 3 equal-cost multi-path ("ECMP") table.

6. The method of claim 1, further comprising grouping the plurality of interfaces together in a link aggregation group ("LAG"), wherein the egress interface within the LAG is selected based on the hash created using the slice identifier, and
wherein selection of the egress interface within the LAG changes based on a new slice path being implemented for the slice identifier.

7. The method of claim 1, further comprising load balancing the plurality of interfaces to retain additional bandwidth at the egress interface based on the slice identifier being assigned to the egress interface.

8. A non-transitory, computer-readable medium comprising instructions that, when executed by a processor, perform stages for slice-based routing, the stages comprising:
receiving a first packet at a switch;
determining, at the switch, a slice identifier for the first packet based on header information of the first packet, wherein the slice identifier uniquely identifies a slice from a plurality of slices in a virtual service network ("VSN"), wherein the plurality of slices represent different virtual networks on a shared physical network infrastructure;
determining, at the switch, a next hop for the first packet;
selecting an egress interface from a plurality of interfaces based on the slice identifier,
wherein the slice identifier is used to create a hash, and the hash is used to select the egress interface; and
sending the first packet from the egress interface to the next hop.

9. The non-transitory, computer-readable medium of claim 8, the stages further comprising determining a different next hop for a second packet, wherein the first and second packets include a same destination address but have different slice identifiers.

10. The non-transitory, computer-readable medium of claim 8, wherein determining the slice identifier includes looking up the slice identifier at the switch based on a destination machine address control ("MAC") address, destination internet protocol ("IP") address, and destination port.

11. The non-transitory, computer-readable medium of claim 8, the stages further comprising:
determining whether a multi-path table exists for sending traffic to the next hop, the multi-path table including multiple links for sending traffic to the next hop; and
when the multi-path table exists, selecting the egress interface from the multi-path table based on the hash created using the slice identifier.

12. The non-transitory, computer-readable medium of claim 11, wherein the multi-path table is a Layer 3 equal-cost multi-path ("ECMP") table.

13. The non-transitory, computer-readable medium of claim 8, the stages further comprising grouping the plurality of interfaces together in a link aggregation group ("LAG"), wherein the egress interface within the LAG is selected based on the hash created using the slice identifier, and wherein selection of the egress interface within the LAG changes based on a new slice path being implemented for the slice identifier.

14. The non-transitory, computer-readable medium of claim 8, further comprising load balancing the plurality of interfaces to retain additional bandwidth at the egress interface based on the slice identifier being assigned to the egress interface.

15. A system for slice-based routing, comprising:
a non-transitory, computer-readable medium containing instructions; and
a processor that executes the monitoring module to perform stages comprising:
receiving a first packet at a switch;
determining, at the switch, a slice identifier for the first packet based on header information of the first packet, wherein the slice identifier uniquely identifies a slice from a plurality of slices in a virtual service network ("VSN"), wherein the plurality of slices represent different virtual networks on a shared physical network infrastructure;
determining, at the switch, a next hop for the first packet;
selecting an egress interface from a plurality of interfaces based on the slice identifier,
wherein the slice identifier is used to create a hash, and the hash is used to select the egress interface; and
sending the first packet from the egress interface to the next hop.

16. The system of claim 15, the stages further comprising determining a different next hop for a second packet, wherein the first and second packets include a same destination address but have different slice identifiers.

17. The system of claim 15, wherein determining the slice identifier includes looking up the slice identifier at the switch based on a destination machine address control ("MAC") address, destination internet protocol ("IP") address, and destination port.

18. The system of claim 15, the stages further comprising:
determining whether a multi-path table exists for sending traffic to the next hop, the multi-path table including multiple links for sending traffic to the next hop; and
when the multi-path table exists, selecting the egress interface from the multi-path table based on the hash created using the slice identifier.

19. The system of claim 18, wherein the multi-path table is a Layer 3 equal-cost multi-path ("ECMP") table.

20. The system of claim 19, the stages further comprising grouping the plurality of interfaces together in a link aggregation group ("LAG"), wherein the egress interface within the LAG is selected based on the hash created using the slice identifier, and wherein selection of the egress interface within the LAG changes based on a new slice path being implemented for the slice identifier.

* * * * *